US006005994A

United States Patent [19]
MacDonald et al.

[11] Patent Number: 6,005,994
[45] Date of Patent: Dec. 21, 1999

[54] OPTICAL SWITCHING GATE

[76] Inventors: Robert I. MacDonald, 6452 Clingin La., Manotick; Jozef Straus, 691 Hillcrest Rd., Ottawa, both of Canada, K2A 2N2

[21] Appl. No.: 09/158,008

[22] Filed: Sep. 22, 1998

Related U.S. Application Data

[63] Continuation-in-part of application No. 08/915,675, Aug. 21, 1997, Pat. No. 5,903,686.
[51] Int. Cl.$^6$ .................................................. G02B 6/26
[52] U.S. Cl. .............................. 385/16; 385/17; 385/24; 359/117; 359/139
[58] Field of Search ........................ 385/16–24; 359/117, 359/128, 139, 154, 173

[56] References Cited

U.S. PATENT DOCUMENTS 5,570,218 10/1996 Sotom ..................................... 385/17 X
5,903,686 5/1999 MacDonald ................................ 385/16

*Primary Examiner*—Phan T. H. Palmer

*Attorney, Agent, or Firm*—Neil Teitelbaum & Associates

[57] ABSTRACT

The present invention relates to an optical logical AND gate comprising an erbium doped waveguide which is attenuating at a signal wavelength and responsive to pump light energy to be transmissive at a signal wavelength. A first laser pump excites a portion of the waveguide. A second laser pump excites a remaining portion of the waveguide. The waveguide is only transparent to transmit a signal if both the first and second pumps excite the waveguide together. The optical AND gate of the present invention can be used as the control element of an N×N matrix. A number of first ports and a number of second ports are interconnected by erbium waveguide AND gates. Pump light is switched to a selected first port. Pump light from a second pump is switched to a selected second port. Only the erbium waveguide gate interconnecting the selected first and second port is transmissive to switch a signal. All other gates are attenuating and other signals are accordingly blocked. A single signal can be switched to a selected output or to a number of outputs to achieve a broadcast function. Advantageously, active switch elements are removed from the signal path, and the signal is switched passively. This switch unit is used to advantage in a multiple stage switch architecture.

18 Claims, 6 Drawing Sheets

OPTICAL SWITCHING GATE

This application is a continuation-in-part of pending U.S. application Ser. No. 08/915,675 filed Aug. 21, 1997 now U.S. Pat. No. 5,903,686.

FIELD OF THE INVENTION

The present invention relates to a fully blocking, optical gate including erbium doped waveguides, a switch matrix constructed from the optical gates of the present invention, and a non-blocking optical switch system incorporating the switch matrix.

BACKGROUND OF THE INVENTION

It is desired to provide optical switching for optical networks in order to increase speed and usable bandwidth. Various forms of optical switches are known, such as U.S. Pat. No. 4,580,873 in the name of Levinson issued Apr. 8, 1986 to AT&T Bell Laboratories, and U.S. Pat. No. 4,988,157 in the name of Jackel et al. However, these switches have not been commercialized and their capabilities are not yet known. At present, large 1×n cross-point optical switches are often configured to obtain functionality provided by nxm matrix switches. In some instances, reliability and cost are reasons for using this "dated" technology in an nxm configuration.

Thus, today, currently available optical switching matrices are being manufactured by use of a single stage architecture where both input and output sides of a P×P matrix are comprised of 1×P rotary switches such as those described by Duck et al. in U.S. Pat. No. 4,378,144. Configuring a plurality of 1×P rotary switches into a single stage P×P switch has the following limitations:

a) the P×P matrix is not modular and when repairs are required, they must be made to the entire switch;
 b) the cost of the switch is largely dependent upon the cost of the number lens-to-fibre units required; and,
 c) the maximum reconfiguration time of the component 1×P rotary switch is directly dependent upon the dimension of the matrix, and is slow due to the mechanical system.

It is usually preferable that optical switches be efficient, fast and compact. As telecommunication networks have evolved over the years and have become more complex, a need has arisen for a matrix switching system capable of optically coupling any one of a large number of other fibers to another.

Furthermore, it is desirable for the switching system to be "non-blocking", i.e. the switching of one input fiber to an output fiber should not interfere with the light transmission of any other input fiber to any other output fiber.

In an application U.S. Ser. No. 08/915,675 now U.S. Pat. No. 5,903,686 by the present applicant, a modular, multiple stage, non-blocking switch architecture is disclosed. This SKOL (4×4 matrix switch) architecture provides more efficient structure that makes use of smaller switch units than required for a single stage switch. One disadvantage of the SKOL architecture, however, is that path loss is increased. Each signal must pass through three times more 1×N switches than in the SDSR matrix, wherein switches dominate path loss. The SDSR matrix is a single stage switched distribution, switched recombination.

Erbium doped fiber has been used as an optical amplifier as it provides signal amplification when excited ("pumped") by a laser preferably with light of a different frequency from the transmitted signal. Matrix switching devices experience loss from passive distributors that divide signal energy, and from active selectors which also introduce losses. Erbium doped fiber amplifiers have been used in matrix switches to compensate for the losses.

When an erbium doped fiber or waveguide is not "pumped," it causes attenuation at the signal wavelength. The level of dopant in the fiber, and the length of the fiber determine the amount of gain or attenuation experienced by the signal.

In U.S. Pat. No. 5,570,218 issued to Sotom, Oct. 29, 1996, in the name of Alcatel N.V., use is disclosed of erbium doped waveguides in an optical switching matrix to reduce crosstalk. The Sotom switching matrix comprises an input waveguide coupled to a 1×n splitter that distributes a signal into erbium fiber amplifiers for distribution to each of the output ports. One amplifying fiber of the splitter is selectively coupled to an output waveguide by an active selector. The active selector is a switch that permits pump light to be transmitted from a single laser pump through the selected amplifying fiber to amplify a signal transmitted through the same fiber. The signal is also switched by the active selector to the selected output port. Other signals from the 1×n splitter are not amplified. As a result the selected signal is significantly stronger than unwanted signals which may cause crosstalk.

This switch is not entirely satisfactory, however. The optical selector must be able to operate at both pump and signal wavelengths, which is a difficult requirement for many optical selector technologies. The number of erbium doped amplifiers required is equal to the square of the number of switch points. Since these amplifiers are not in general, inexpensive, it would be advantageous to construct a large switch out of smaller subunits.

It is shown here that the number of amplifiers required can be fewer than are taught in the Sotom design, if the subunits are blocking switches. The use of a blocking switch subunit, in the present invention, enables a switch construction to make use of a simple power divider to broadcast of one of the input signals to many output ports.

It is desired to provide an optical switch providing passive optical switching for a signal without having active switch elements in the signal path.

It is further desired to provide a fully blocking optical switch element to prevent crosstalk.

SUMMARY OF THE INVENTION

A logical AND gate can be made in erbium fiber (EAND) providing a length of attenuating waveguide which can be excited by laser pump at opposite ends. The full length of the fiber is transparent for signal transmission only when laser pumps at both ends are activated. If only one or neither end is pumped, a signal is substantially completely attenuated before reaching a switch location.

A logical OR gate can also be made in erbium fiber (EOR). In this case only one laser pump is needed to select a desired signal path and excite the waveguide to transparency.

A switch matrix can be constructed comprising a plurality of input and output ports interconnected by EAND gates. A pair of laser pumps at the input and output can be directed to a selected input and output port. The interconnecting waveguide, pumped from both ends to transparency, provides a unique path for passively switching a signal. Laser pump light can be directed to one or more output ports. thus permitting a signal to be distributed to a plurality of locations. Advantageously, the switch matrix is blocking and other interconnecting EAND gates, not pumped at both ends, extinguish other signals.

A similar EOR gate matrix in erbium fiber provides selection of one of a plurality of doped waveguides, for switching a signal from one or more waveguides coupled to the doped waveguides, when pump light from a single laser is directed to a selected doped waveguide. Light in other attenuating distribution waveguides is extinguished before reaching a switch location.

Accordingly, an optical AND gate for selective transmission of optical signals in an optical system, of the present invention comprises:
- a waveguide including a first responsive portion and a second responsive portion, each portion having attenuating transmissivity at a signal wavelength in a first state and having transparent transmissivity at a signal wavelength in response to excitement from pump light in a second state;
- first pump means optically coupled to a first end of the waveguide for selectively injecting a pump light to excite the first responsive portion; and,
- second pump means optically coupled to a second end of the waveguide for selectively injecting a pump light to excite the second responsive portion, whereby a signal may be transmitted when both the first and the second responsive portions of the waveguide are excited to a second state; and
whereby attenuation in the first responsive portion or the second responsive portion, in a first state, is sufficient to substantially extinguish a signal for the purpose of eliminating unwanted signals.

In accordance with a further embodiment of the present invention an EAND gate matrix of the present invention, for switching an optical signal to at least one selected location, comprises:
- a plurality of first ports for receiving and transmitting optical signals;
- a plurality of second ports for receiving and transmitting optical signals;
- a plurality of intermediate waveguides for connecting each of the first ports with each of the second ports, each intermediate waveguide having a first responsive portion and a second responsive portion, each portion having attenuating transmissivity at a signal wavelength, and being responsive to excitement from pump light for transparent transmission at a signal wavelength;
- a first pump for injecting a pump light for exciting the first portions of the intermediate waveguides;
- first switching means for directing the first pump light to intermediate waveguides connected to a selected first port;
- second pump for injecting a pump light for exciting the second portions of the intermediate waveguides;
- second switching means for directing the second pump light to intermediate waveguides connected to a selected second port, whereby injecting pump light from the first and second pumps to the first and second responsive portions on a common intermediate waveguide connecting the selected first port and the selected second port provides a transparent transmission path for switching the optical signal from the selected first port to the selected second port, and whereby attenuating responsive portions of intermediate waveguides block transmission between other first ports and other second ports not selected by both first and second pumps.

A further embodiment of the present invention provides a system having 2R switching modules, at least R input switching modules for switching P optical signals you at least P locations on output modules in a non-blocking manner, said at least R input modules each comprising:
- a first stage comprising a 1×(2M−1) optical signal power divider for each input M, wherein M=Ceiling [P/R]; and
- a second stage comprising (2M−1) EAND gate matrices, each coupled to outputs of each of the M power dividers, wherein the EAND gate matrices each comprise:
  M first ports and R second ports;
  a plurality of intermediate waveguides for connecting each of the first ports with all of the second ports, each intermediate waveguide having attenuating tranimissivity at a signal wavelength, and being responsive to excitement from pump light for transparent transmission at a signal wavelength;
  first pump for injecting a pump light for exciting a first portion of some of the intermediate waveguides;
  first switching means for directing the first pump light to intermediate waveguides connected to a selected first port;
  second pump for injecting a pump light for activating a second portion of the intermediate waveguides;
  second switching means for directing the second pump light to intermediate waveguides connected to a selected second port, whereby activation of the first and second pumps on a common intermediate waveguide connecting the selected first port and the selected second port provides a transparent transmission path for switching the optical signal from a selected first port to a selected second port, and
wherein second ports of the input modules are coupled to at least some of the output modules.

Advantageously, because EAND erbium fiber construction blocks other signals from propagating in the signal path crosstalk is essentially eliminated.

A further advantage is that the optical signal is passively switched to the desired location.

Amplification within erbium doped waveguides advantageously can be adapted to compensate for path loss, especially in a multiple stage switch architecture where loss is primarily due to the increased number of switches in the optical path.

Additional advantages will be understood to persons of skill in the art from the detailed description of preferred embodiments, by way of example only, with reference to the following figures:

BRIEF DESCRIPTION OF THE FIGURES

Like numerals are used throughout to indicate like elements.

DETAILED DESCRIPTION OF PREFERRED EMBODIMENTS

Figure 1:
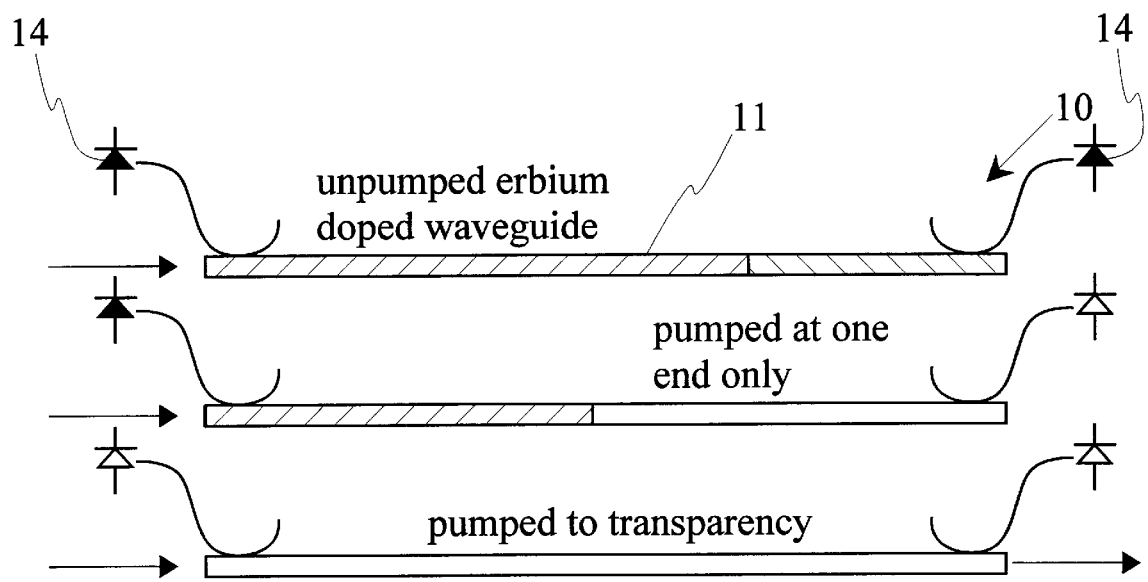
FIG. 1 is a schematic illustration of an EAND gate in accordance with the present invention.

FIG. 1 illustrates three erbium doped waveguides 11, each including a laser pump 14 coupled at each end comprising an erbium optical AND gate (EAND) 10. In the first waveguide 11 both pumps 14 are off, and not providing light energy to the waveguide. The waveguide 11 is non-transmissive. The second waveguide 11 shows a first pump 14 off, but the second on providing light energy to a portion of the waveguide 11. The second pump excites only a portion of the waveguide 11, and the waveguide 11 is still non-transmissive. The third waveguide 11 shows both pumps 14 on, and the waveguide 11 is pumped to transparency.

Figure 2:
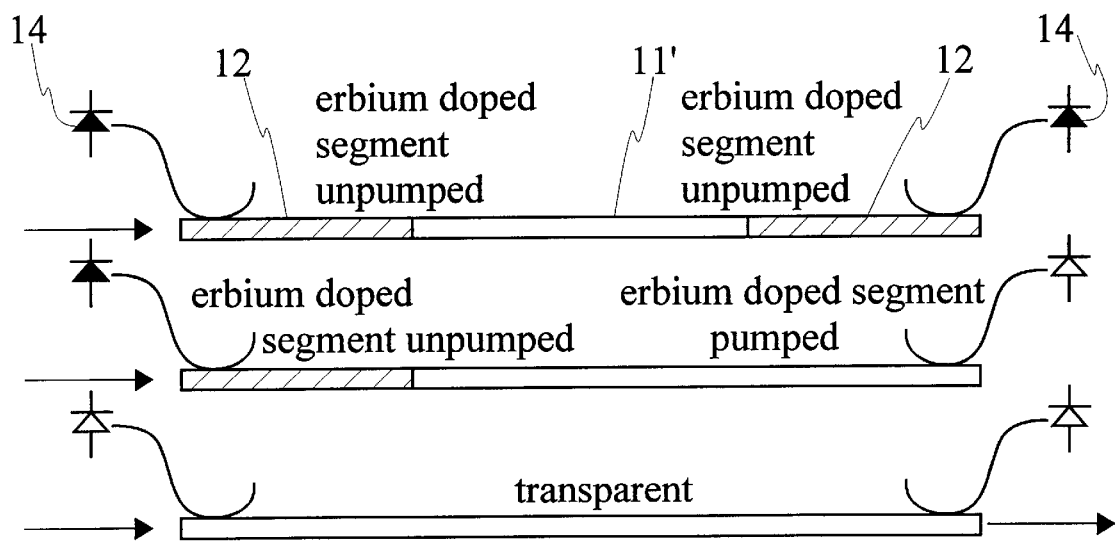
FIG. 2 is a schematic illustration of an alternative EAND gate to FIG. 1, including doped segments in a common waveguide.

FIG. 2 illustrates a similar arrangement. However, only segments 12 of each waveguide 11' associated with the cooperating laser pumps 14 are doped. The segments 12 have a length to provide sufficient attenuation to reduce any crosstalk to acceptable levels. In order to provide an effective switch gate in accordance with the invention, an attenuation of about 25 dB or more is preferred to provide substantial extinction of unwanted signals. The level of acceptable attenuation will, of course, vary in different applications.

Erbium doping is used throughout this application to refer to waveguides adapted to provide transmission in response to excitation by a source of pump light sufficiently intense, such as from a laser, and attenuation in an unexcited state. Doping with other rare earth materials can also be used. While the amplifying qualities of erbium doped fiber can be used to advantage to compensate for switch induced loss, it is the selectively attenuating and transmissive quality of the erbium doped fibers which provide functionality to the present optical gate.

Figure 3:
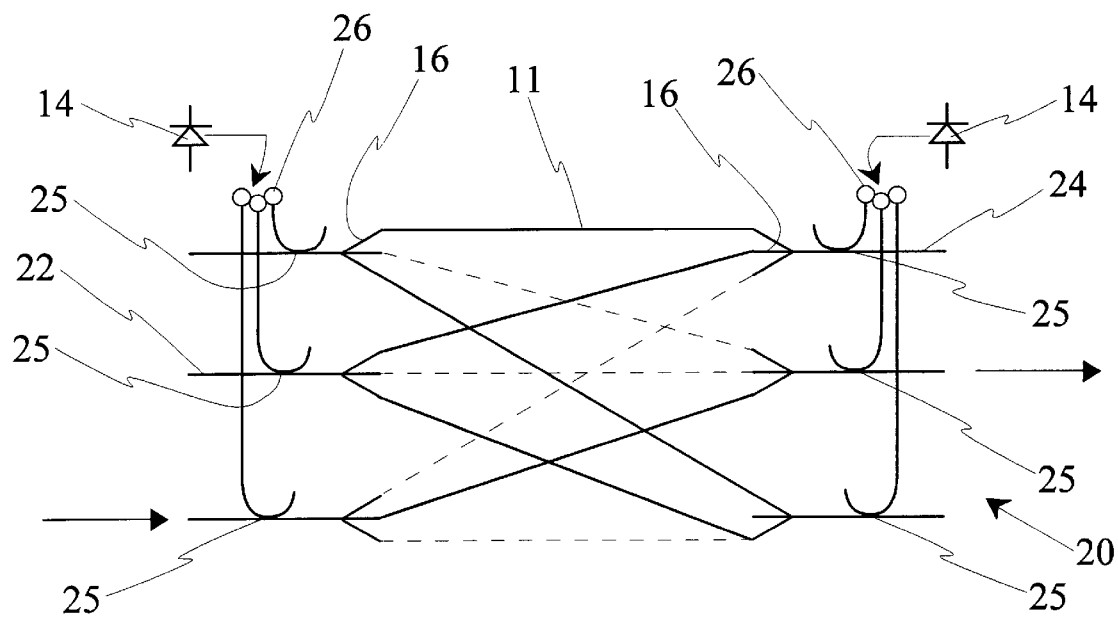
FIG. 3 is a schematic illustration of an EAND gate switch matrix incorporating the EAND gate of FIG. 1, in operation.

FIG. 3 illustrates the EAND gate 10 as an element in a blocking switch matrix 20. Three input ports 22 from signal paths are interconnected by erbium doped waveguides or fibers 11 to three output ports 24. Erbium doped waveguides 11 connect each of the input ports 22 to all of the output ports 24. A laser pump 14 at each end includes an active selector switch 26 to direct pump light to a selected port 22 and 24. Conveniently, at pump light wavelengths (eg. 980 nm) a polymer switch having higher speed and greater reliability can be used. These switches do not provide such qualities at the signal wavelengths, which have longer wavelengths (eg. 1500+ nm), but the switches 26 are not in the signal path for this design, and so do not deleteriously affect the signal. A signal from any one of the signal waveguides is selected by the laser pump switches, which direct pump light to the selected port. A pump signal wavelength division multiplexer/demultiplexer 25 couples pump light into the selected signal waveguides. The interconnecting doped waveguides 11 are connected by splitters 16 to each of the input and output ports 22, 24. As can be seen in FIG. 3, pump light is directed through the splitter to each of the output ports 24 (shown by dotted lines). A pump 14 and splitters 16 at the opposite end likewise select a desired output port 24 and broadcast pumped light through intermediate doped waveguides 11 (shown by dotted lines). Pumped light is sufficient to excite only a portion of a doped waveguide 11. Only the intermediate waveguide 11 pumped at both ends between the selected input port and the selected output port (shown by a dark line), is fully transparent to transmit the signal. A signal is likewise directed through the splitter 16 toward each of the output ports. Only the signal in the transparent waveguide is switched. Other signals from the splitter 16 are attenuated before reaching an output port 24. Thus a signal from input port 3 is passively switched to output port 2.

An EAND gate matrix 20 as described above, also has the capability to broadcast a single one of its incoming signals to a plurality up to all of its output ports. It can be seen in FIG. 3 that by connecting pump light to the selected input and pump light also to several outputs, it is possible to deliver a single signal to all the selected outputs. The pump levels are the same as the pump levels that provide lossless point to single point operation.

Figure 4:
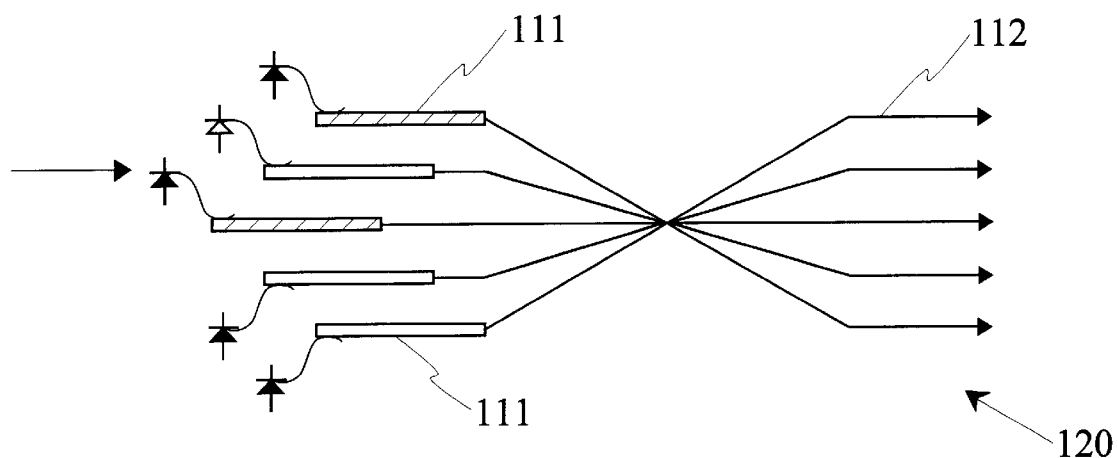
FIG. 4 is a schematic illustration of an EOR gate switching matrix in accordance with the invention.

FIG. 4 illustrates an EOR gate switching matrix 120 in which a single pump 14 can be switched to one of a plurality of doped fibers 111. Fibers 111 become fully transparent when excited by a single laser pump 14. Signals from the selected fiber or waveguide 111 are transmitted to a splitter 16, such as a star coupler, for distribution to a plurality of outputs 112. Any one of the selected input doped fibers 111 can distribute a signal to all of the output fibers 112. Alternatively, a signal from one or more fibers 112 can be switched to one of a plurality of doped fibers 111 when it is selected by a laser pump 14.

Figure 5:
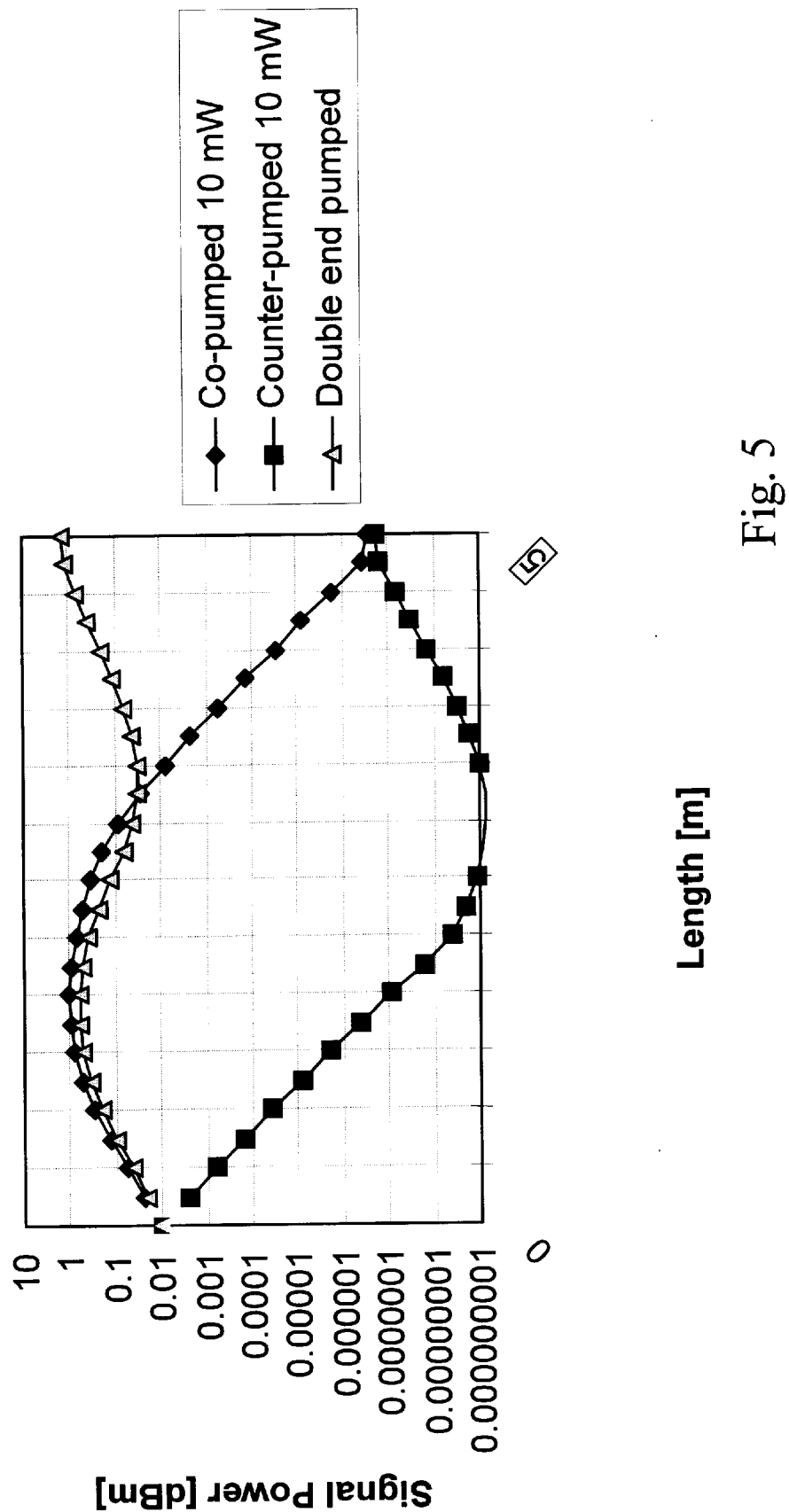
FIG. 5 is a graph of signal power in decibels versus length of erbium doped waveguide.

FIG. 5 graphically illustrates the power attenuation over a length of heavily doped erbium fiber. A 5 meter length of commercially available erbium doped fiber exhibits approximately 0 dB gain when weakly pumped from both ends, but has a loss of more than 60 dB when only pumped from one end. Thus signals in un-selected waveguides, those pumped only at one end, or not at all, experience attenuation to substantially block any unwanted signals. The system also provides transparent transmission to switch selected signals with little or no gain. This can be achieved at very low power, eg. only 10 mW. Erbium doped waveguides could be used instead of erbium doped fibers to make compact switch structures possible.

Figure 6:
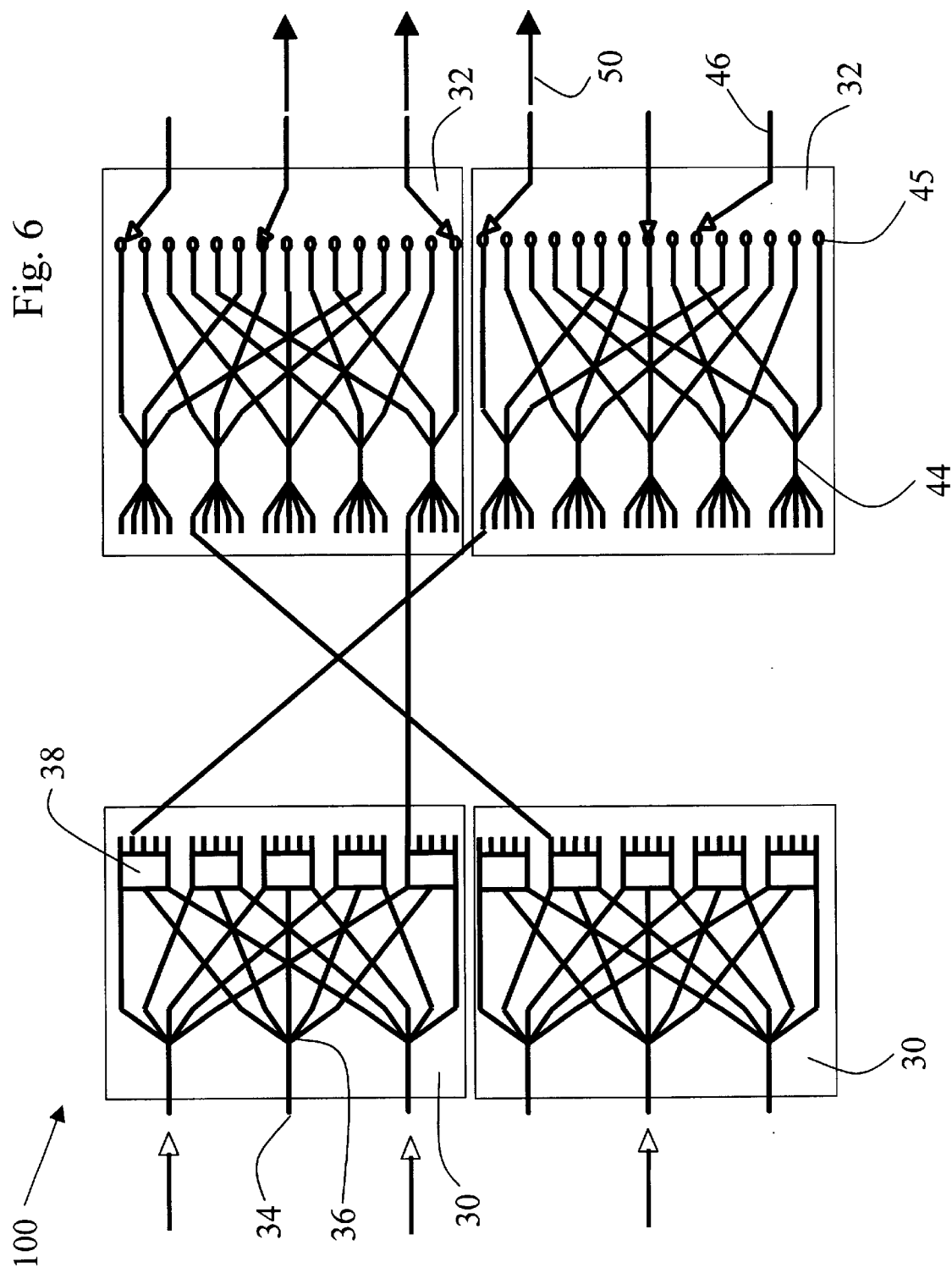
FIG. 6 illustrates a SKOL switching matrix in accordance with the present invention.

The EAND gate can be used as the control element of an N×N matrix, such as the switch matrix 20, as shown in FIG. 3. This switch unit is used to advantage, for instance, in the SKOL switch architecture, where switches for laser pumps can be efficiently arranged to use a minimum of laser pumps and fiber to lens connections to provide rapid optical switching, as illustrated in FIG. 6. The blocking EAND gate switch matrix 20 provides the desired functionality in the non-blocking multiple stage switch architecture.

The switch shown in FIG. 6 includes two-stage switching modules, in accordance with the SKOL optical switch architecture. In this case two input modules 30 are interconnected to two output modules 32. A first stage of M inputs for each module 30 are switched to a second stage of (2M−1) second stage EAND gate matrices 38. Each EAND gate matrix 38 has R outputs, where R is the number of output modules 32. M is an integer greater than 1 and at least P/R, where P is the total number of inputs for the switch. Output modules 32 each include (2M−1)R first stage inputs 44 interconnected to M second stage outputs 46.

Each input module 30 has, in this case, M=3 signal input ports 34 through each of which a signal is transmitted to a splitter 36. The splitter 36 divides each signal anc broadcasts it to five second stage switches 38, which are blocking EAND matrices. The EAND matrix 38 has M inputs (corresponding to the number of input ports of the nodule 30) and R outputs (corresponding to the number of output modules 32, in this case R=2). These M input and R output ports are interconnected by erbium doped waveguides, as described in FIG. 3. A first pump 40 provides pump light to select a desired input port M for each EAND matrix 38. Thus the desired distributed signal is selected. A second pump 42 provides pump light to select a desired output port R of the EAND matrix 38. This switches a signal to the desired output module 32. The common erbium doped waveguide 10 between the selected input port M and output port R is accordingly the only transmissive waveguide through the EAND matrix 38. Other signals are blocked. Since only three signals may pass through the module, only three pumps 40 and three pumps 42 are needed to supply the five EAND matrices 38. Pump light may be is switched through a separate switching matrix, as illustrated in FIG. 7, to direct light to the selected EAND matrix 38 and further switching by an active selector 26 selects the desired input M and output R.

Figure 7:
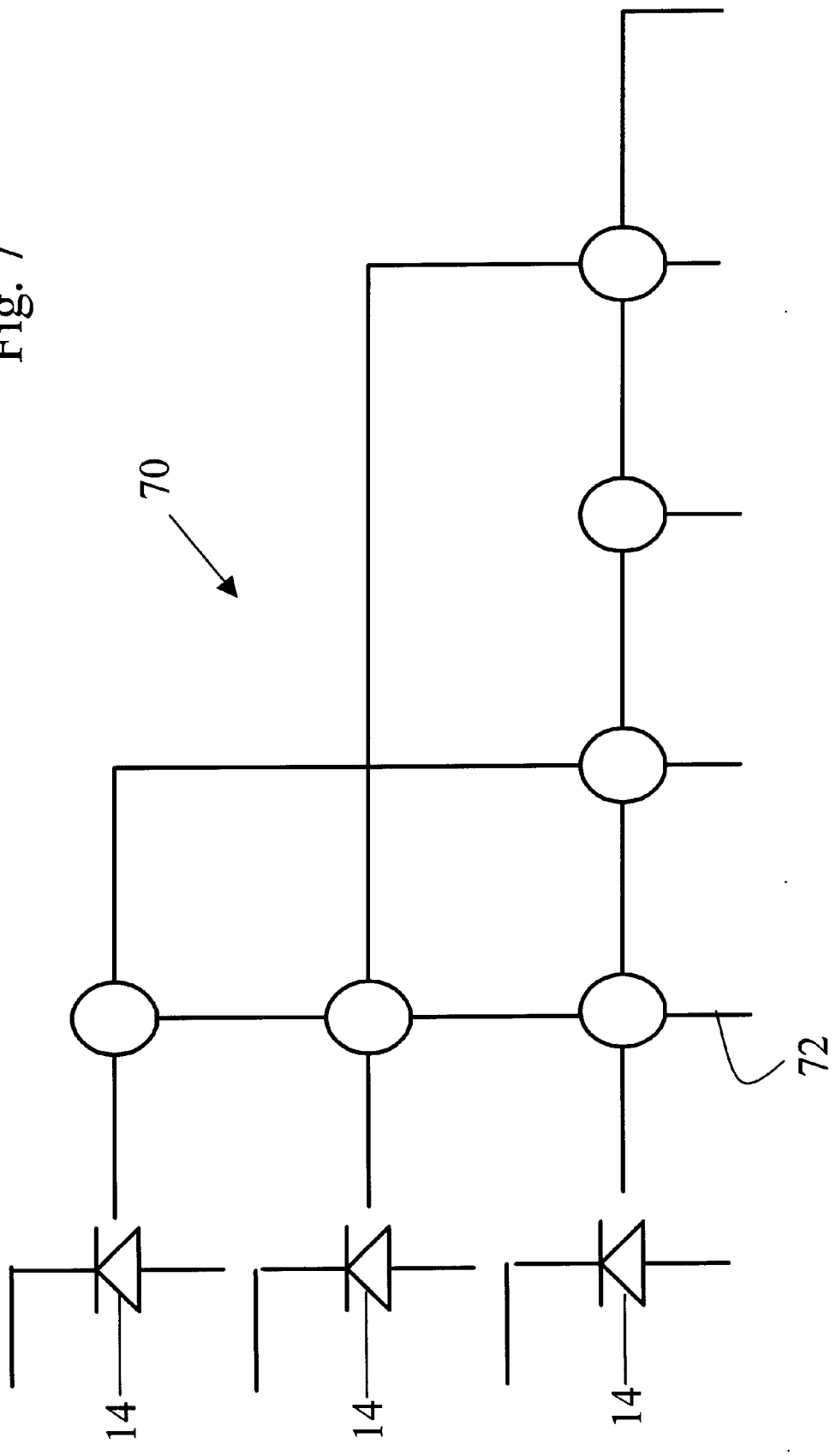
FIG. 7 illustrates a laser pump switch configuration for use in the switching matrix of FIG. 6; and, FIG. 8 illustrates an EAND gate switch matrix from the SKOL switch of FIG. 6.
Figure 8:
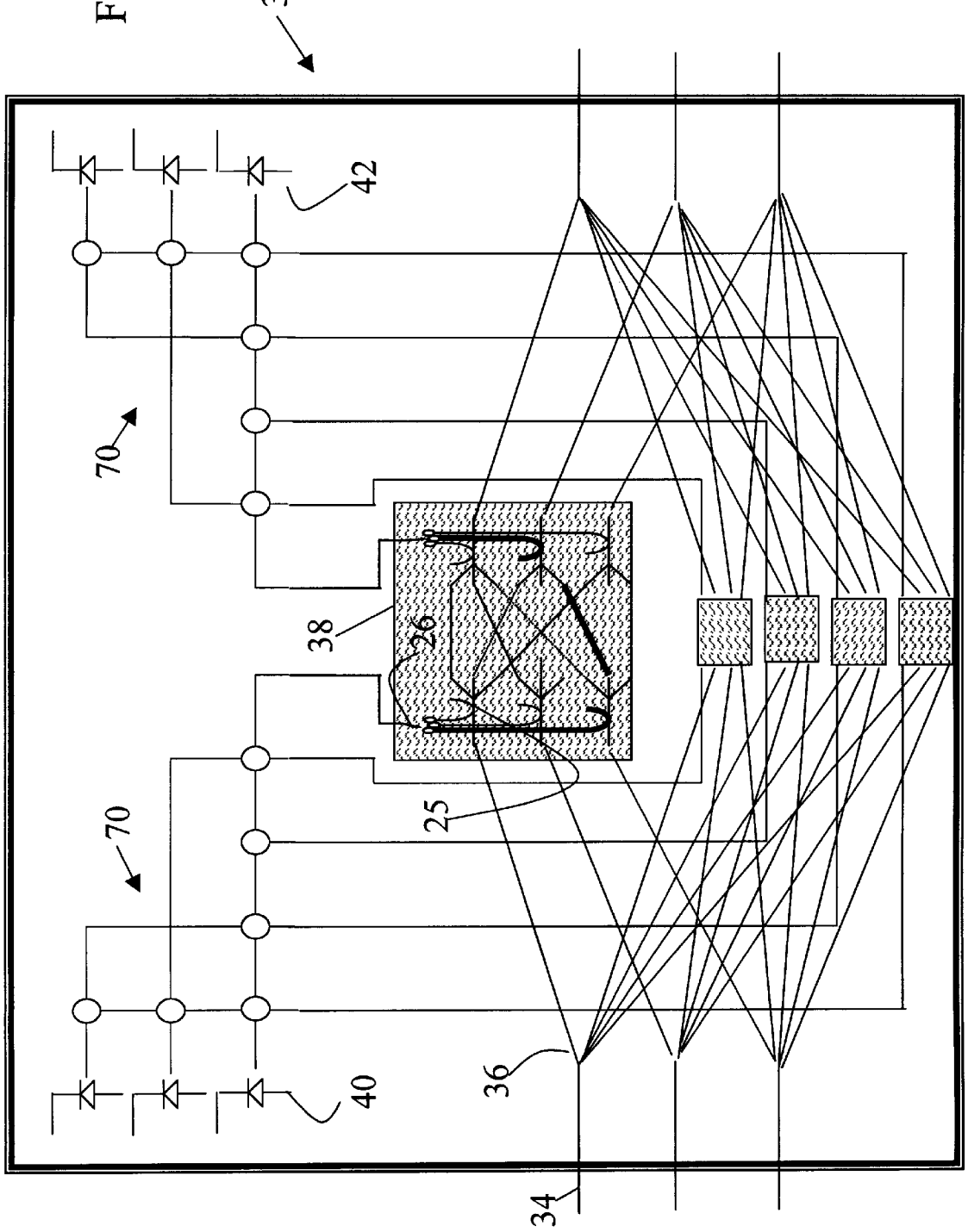

FIG. 7 illustrates three laser pumps 14 interconnected in a cross point matrix 70. Five pump outputs 72 are selectively coupled to the 5 EAND matrices 38. Thus pump light can be directed to any three of the five EAND matrices 38. This light is input through the selector switch 26 of the chosen EAND matrix 38 which selects which M input and which R output of the matrix 38 is pumped. A polymer switch is a preferred switch for the laser pump light, though other opto-electronic or mechanical switches known in the art can be used. Two such systems are required for each module 30.

As the EAND matrices 38 are fully blocking, only the selected signal is transmitted to the selected output module 32. A signal is coupled into the output module 32 into a star coupler 44. The switch 100 is configured so that a star coupler 44 will only receive one signal from the blocking EAND gates 38 of the input modules 30. The star coupler 44 transmits the signal to each group of the output terminals 45 associated with, ach output waveguide 50 where an active selector switch 46 associated with each output waveguide 50 couples the desired output signal to the selected output waveguide 50. This multistage switch reduces the number of laser pumps 14 required for non-blocking operation in comparison with single stage switches.

The star couplers may comprise EOR gates in conjunction with the active selectors to better isolate the output signals, if additional laser pumps are available. The EOR gates include R input ports for receiving a single signal from one of the blocking EAND gates of the R input modules and M output ports, comprising erbium doped wave guides. The active selector couples a laser pump to a selected output port for coupling a signal to a selected location P.

A bi-directional switch according to the SKOL architecture can also be made. In this case input and output modules are identical to the input modules 30. The switch does require twice as many laser pumps. Advantagcously, essentially no crosstalk occurs in the switched signals, since switch elements on both input and output modules are fully blocking.

The broadcast function of the EAND gate matrices can provide a broadcast function in the SKOL matrix whereby any input can be delivered to any desired subset of the outputs.

Of course, numerous other embodiments may be envisaged, without departing from the spirit and scope of the invention as defined in the appended claims.

What is claimed is:
1. An optical AND gate for selective transmission of optical signals in an optical system comprising:

a waveguide including a first responsive portion and a second responsive portion, each portion having attenuating transmissivity at a signal wavelength in a first state and having transparent transmissivity at a signal wavelength in response to excitement from pump light in a second state;

first pump means optically coupled to a first end of the waveguide for selectively injecting pump light to excite the first responsive portion; and, second pump means optically coupled to a second end of the waveguide for selectively injecting pump light to excite the second responsive portion, whereby a signal may be transmitted when both the first and the second responsive portions of the waveguide are excited to a second state; and whereby attenuation in the first responsive portion or the second responsive portion, in a first state, is sufficient to substantially extinguish a signal for the purpose of eliminating unwanted signals.

2. An AND gate as defined in claim 1, wherein at least a part of the waveguide is doped with a rare earth.

3. An AND gate as defined in claim 2, wherein the rare earth is erbium.

4. An AND gate as defined in claim 3, wherein the first responsive portion and the second responsive portion comprises a continuous length of the waveguide.

5. An AND gate as defined in claim 3, wherein the first responsive portion and the second responsive portion comprise discrete segments within the waveguide.

6. An EAND gate switch matrix for switching an optical signal to a selected location, comprising:

a plurality of first ports for receiving and transmitting optical signals;

a plurality of second ports for receiving and transmitting optical signals;

intermediate waveguides connecting each of the first ports with all of the second ports, each intermediate waveguide having a first state attenuating transmission at a signal wavelength, and a second state responsive to excitement from pump light providing transparent transmission at a signal wavelength;

first pump for injecting a pump light for exciting a first portion of the intermediate waveguides;

first switching means for directing the first pump light to intermediate waveguides connected to a selected first port;

second pump for injecting a pump light for exciting a second portion of the intermediate waveguides;

second switching means for directing the second pump light to intermediate waveguides connected to a selected second port, whereby excitement by the first and second pumps of a common intermediate waveguide connecting the selected first port and the selected second port provides a transparent transmission path for switching the optical signal from a selected first port to a selected second port.

7. A switch matrix as defined in claim 6, wherein the intermediate waveguides are doped with a rare earth for at least a part of their length.

8. A switch matrix as defined in claim 7, wherein the waveguides are doped with erbium and the first and second portion of the doped waveguides each has attenuation properties in the first state sufficient to substantially extinguish a signal for the purpose of eliminating unwanted signals.

9. A switch matrix as defined in claim 7, wherein the first portion and the second portion of the doped waveguides together comprise substantially the full length of the intermediate waveguides.

10. A switch matrix as defined in claim 6, wherein the second switching means comprises selector means for directing pump light to intermediate waveguides connected to a plurality of selected second ports for broadcasting a signal from a selected first port to a selected plurality of second ports.

11. A system having 2R switching modules, at least R input switching modules for switching P optical signals to at least P locations on output modules in a non-blocking manner, said at least R input modules each comprising:

a first stage comprising a 1×(2M−1) optical signal power divider for each input M, wherein M=Ceiling [P/R]; and a second stage comprising (2M−1) EAND gate switch matrices, each coupled to outputs of each of the M power dividers, wherein the EAND gate switch matrices each comprise:

M first ports and R second ports;

a plurality of intermediate waveguides for connecting each of the first ports with all of the second ports, each intermediate waveguide having attenuating transmissivity at a signal wavelength, and being responsive to excitement from pump light for transparent transmission at a signal wavelength;

first pump for injecting a pump light for exciting a first portion of some of the intermediate waveguides;

first switching means for directing the first pump light to intermediate waveguides connected to a selected first port;

second pump for injecting a pump light for exciting a second portion of the intermediate waveguides;

second switching means for directing the second pump light to intermediate waveguides connected to a selected second port, whereby excitement of the first and second pumps on a common intermediate waveguide connecting the selected first port and the selected second port provides a transparent transmission path for switching the optical signal from a selected first port to a selected second port, and wherein second ports of the input modules are coupled to at least some of the output modules.

12. A system as defined in claim 11, further including R output modules including the at least P locations, for optically coupling to R second ports of the EAND gate switch matrices of the R input modules, each said output module comprising:

a first stage of (2M−1) power dividers of dimension R×M each power divider for receiving a signal from an input module and distributing it to M terminals;

a second stage of (2M−1)×1 active selectors for coupling a signal from the M(2M−1) terminals to a selected location P.

13. A system as defined in claims 12, wherein the power dividers comprise star couplers.

14. A system as defined in claim 12, wherein the second switching means of the input module comprises selector means for directing pump light to intermediate waveguides connected to a plurality of selected second ports for broadcasting a signal from a selected first port to a selected plurality of second ports, whereby at least one of the P signals is switched to a plurality of locations.

15. A system as defined in claim 12, wherein the power dividers comprise EOR gates including: R input ports for receiving a single signal from one of the blocking EAND gate switch matrices of the R input modules and M output ports, comprising waveguides having attenuating transmissivity at a signal wavelength, and being responsive to excitement from pump light for transparent transmission at a signal wavelength, and wherein the active selector couples a pump to a selected output port for coupling a signal to a selected location P.

16. A system as defined in claim 11, wherein the second switching means comprises selector means for directing pump light to intermediate waveguides connected to a plurality of selected second ports for broadcasting a signal from a selected first port to a selected plurality of second ports.

17. A system as defined in claim 11, further including R output modules for optically coupling to the R input modules, each said output module being substantially symmetrical to the R input modules, wherein second ports of the EAND gate switch matrices of the input modules are coupled to second ports of EAND gate switch matrices of the output modules.

18. A system as defined in claim 17, wherein the input modules and output modules are functionally identical.

* * * * *